(12) United States Patent
Kassmann

(10) Patent No.: US 6,714,899 B2
(45) Date of Patent: *Mar. 30, 2004

(54) ROBUST STEADY-STATE TARGET CALCULATION FOR MODEL PREDICTIVE CONTROL

(75) Inventor: Dean E. Kassmann, Houston, TX (US)

(73) Assignee: Aspen Technology, Inc., Cambridge, MA (US)

( * ) Notice: Subject to any disclaimer, the term of this patent is extended or adjusted under 35 U.S.C. 154(b) by 428 days.

This patent is subject to a terminal disclaimer.

(21) Appl. No.: 09/819,475

(22) Filed: Mar. 28, 2001

(65) Prior Publication Data

US 2001/0021900 A1 Sep. 13, 2001

Related U.S. Application Data

(63) Continuation of application No. PCT/US99/22368, filed on Sep. 28, 1999.
(60) Provisional application No. 60/102,325, filed on Sep. 28, 1998.

(51) Int. Cl.$^7$ ............................ G06F 17/10; G05B 13/02
(52) U.S. Cl. ............................ 703/2; 700/28; 700/44
(58) Field of Search ............................ 703/2; 700/28, 700/29, 30, 34, 40, 41, 42, 43, 44, 52

(56) References Cited

U.S. PATENT DOCUMENTS

| | | | |
|---|---|---|---|
| 5,351,184 A | 9/1994 | Lu et al. | 364/165 |
| 5,408,405 A | 4/1995 | Mozumder et al. | 364/151 |
| 5,424,962 A | 6/1995 | Bouchez et al. | 364/554 |
| 5,481,453 A | 1/1996 | Desantis | 364/162 |
| 5,561,599 A | 10/1996 | Lu | 364/164 |
| 5,566,065 A | 10/1996 | Hansen et al. | 364/164 |
| 5,568,378 A | 10/1996 | Wojsznis | 364/164 |
| 5,572,420 A | 11/1996 | Lu | 364/153 |
| 5,574,638 A | 11/1996 | Lu | 364/165 |

(List continued on next page.)

FOREIGN PATENT DOCUMENTS

WO    WO 97/00468    1/1997

OTHER PUBLICATIONS

Bard, Y., *Nonlinear Parameter Estimation*, Academic Press, Inc., NY 1974, pp. 184–189.

Ben–Tal, A. and A. Nemirovski, "Robust Solutions of Uncertain Linear Programs via Convex Programming", Technical Report, Technion Institute of Technology, Haifa, Israel, 1996.

(List continued on next page.)

*Primary Examiner*—Russell Frejd
(74) *Attorney, Agent, or Firm*—Hamilton, Brook, Smith & Reynolds, P.C.

(57) ABSTRACT

A method and apparatus for steady-state target calculation that explicitly accounts for model uncertainty is disclosed. In accordance with one aspect of the invention, when model uncertainty is incorporated, the linear program associated with the steady-state target calculation can be recast as a highly structured nonlinear program. In accordance with another aspect of the invention, primal-dual interior point methods can be applied to take advantage of the resulting special structure. For a system having characteristic gain parameters G having a known uncertainty description, the present invention provides a method and apparatus for selecting steady-state targets for said system-manipulated variables such that all system-controlled variables will remain feasible at steady-state for all possible values of the parameters G within the known uncertainty description. A nominal estimate $\hat{G}$ of the system parameters G is made, and in accordance with another aspect of the invention, the steady-state targets are selected such that when $\hat{G}=G$, the system is driven to an operational steady-state in which the objective function is extremized.

6 Claims, 7 Drawing Sheets

U.S. PATENT DOCUMENTS

| | | | |
|---|---|---|---|
| 5,579,401 A | 11/1996 | Gear | 382/100 |
| 5,978,752 A | 11/1999 | Morris | 702/186 |
| 6,026,334 A | 2/2000 | Kayihan et al. | 700/28 |
| 6,047,221 A | 4/2000 | Piche et al. | 700/44 |
| 6,064,809 A | 5/2000 | Braatz et al. | 395/500.23 |
| 6,162,488 A | 12/2000 | Gevelber et al. | 427/8 |
| 6,381,505 B1 * | 4/2002 | Kassman et al. | 700/44 |

OTHER PUBLICATIONS

Ben–Tal, A. and A. Nemirovski, "Robust Convex Optimization," Technical Report, Technion Institute of Technology, Haifa, Israel, Dec. 1996.

Boyd, S. et al., "Control Applications of Nonlinear Convex Programming," *Journal of Process Control 9(5–6)*, pp. 313–324, 1998.

Cutler, C. et al., An Industrial Perspective on Advanced Control, *AIChE National Meeting*, Washington, D.C. 1983.

Cutler, C. and B.L. Ramaker, "Dynamic Matrix Control—A Computer Control Algorithm," *AIChE National Meeting*, Houston, Texas 1979.

Hettich, R. and K. Kortanek, "Semi–Infinite Programming: Theory, Methods and Applications," *SIAM Review 29(3)*, Sep. 1993, pp. 380–429.

Lobo, M.S. et al., "Applications of Second–Order Cone Programming," in *Linear Algebra and Its Applications*, 284:193–229, Nov. 1998.

Polak, E., "On the Mathematical Foundations of Non–Differentiable Optimization in Engineering Design," *SIAM Review 29(1)*, Mar. 1987, pp. 21–89.

Prekopa, A., *Stochastic Programming*, Kluwer Academic Publishers, Boston 1995, pp. 311–317.

Qin, S.J. and T.A. Badgwell, "An Overview of Industrial Model Predictive Control Technology," in *Chemical Process Control: Assessment and New Directions for Research*, J.C. Kantor, C.E. Garcia and B. Carnahan, eds. No. 93 in *AIChE Symposium Series 316*, 1997, pp. 232–256.

Muske, K.R. and J.B. Rawlings, "Model Predictive Control with Linear Models," *AIChE Journal 39 (2)*, 1993, pp. 262–287.

Whittle, P., Optimization Under Constraints: Theory and Applications of Nonlinear Programming, *Wiley Series in Probability and Mathematical Statistics*, John Wiley & Sons, Ltd., NY, 1971, pp. 180,182.

Ricker, N.L. and J.H. Lee, "Nonlinear Model Predictive Control of the Tennessee Eastman Challenge Process," *Computers & Chemical Engineering*, GB, Oxford 19(9), Sep. 1995, pp. 961–981.

* cited by examiner

US 6,714,899 B2

ROBUST STEADY-STATE TARGET CALCULATION FOR MODEL PREDICTIVE CONTROL

RELATED APPLICATION(S)

This application is a continuation of International Application No. PCT/US99/22368, which designated the United States and was filed on Sep. 28, 1999, published in English, which claims priority to U.S. patent application Ser. No. 09/266,709, filed on Mar. 11, 1999, now U.S. Pat. No. 6,381,505 which claims the benefit of U.S. Provisional Application No. 60/102,325, filed on Sep. 28, 1998. The entire teachings of the above application(s) are incorporated herein by reference.

FIELD OF THE INVENTION

This invention relates generally to the field of computer-based control systems and control algorithms therefor, and more particularly relates to a Model Predictive Control class of computer control algorithms.

BACKGROUND OF THE INVENTION

Model Predictive Control ("MPC") refers to a class of computer control algorithms that compute sequences of manipulated variable adjustments (control moves) in order to optimize the future behavior of a system. Computerized control systems making use of MPC technology are particularly well-suited for controlling such complex industrial systems as manufacturing plants, chemical processing plants, petroleum refineries, and the like. Such systems have many parameters (flow rates, temperatures, pressures, and so on) which require continuous real-time or nearly real-time adjustment or tuning.

As the name suggests, MPC uses an explicit model to predict how a process will evolve in time. The prediction is used to determine "optimal" control moves that will bring the process to a desired state. The optimal control moves are the result of an online optimization which is, in general, a full-blown nonlinear program ("NLP"). In practice, though, because linear models are used, the resulting optimizations are linear and quadratic programs. While originally developed to address the needs of power plants and petroleum refineries, MPC technology is now used in a wide variety of commercial and industrial applications ranging from food processing to pulp and paper production.

In many modern industrial processing plants, MPC is implemented as part of a multi-level hierarchy of control functions. FIG. 1 depicts, in block diagram form, a control system 10 suitable for controlling, for example, an industrial plant or the like having a plurality of operational components which require parametric control of one or more (usually a plurality) of controlled variables to maintain a desired operational status for the plant overall. In one embodiment, for example, controller system 10 may be a chemical processing plant. Those of ordinary skill in the art would appreciate that such a plant would have various operational components, such as electronically-controlled flow valves, pressure valves, heating and cooling systems, and the like, which require continuous monitoring and parametric adjustment or control in order to ensure proper functioning of the plant as a whole.

The block diagram of FIG. 1 illustrates the differences between a standard conventional control hierarchy and one using MPC. In FIG. 1, a "conventional" control hierarchy is represented within dashed line 12, and an MPC control hierarchy is represented within dashed line 14. As would be apparent to those of ordinary skill in the art, each of the control hierarchies 12 and 14 functions to generate control signals, represented by lines 16 in FIG. 1, to be applied to controlled systems or components in, for example, an industrial plant of some sort. In the exemplary embodiment of FIG. 1, the "controlled components" include flow controllers 18, pressure controllers 20, temperature controllers 22, and level controllers 24 as examples, although it is to be understood that the class of controlled components and systems includes many other types of functional units adapted to be adjusted or controlled by means of one or more electrical control signals.

In FIG. 1, conventional control hierarchy 12 is shown being comprised of several discrete components. Central to control hierarchy 12 is one or more single-parameter controllers 26, one type of which being commonly referred to as a proportional, integrating, derivative ("PID") controller. Those of ordinary skill in the art will appreciate that various types of PID controllers are available as commercial, off-the-shelf components from, by way of example but not limitation, Honeywell, Inc., Minneapolis, Minn. Such controllers implement simple control algorithms to generate a single parameter control output signal in response to one or more inputs. Controller 12 in FIG. 1 is shown to further comprise other logic blocks, such as lead/lag ("L/L") block 28, summation ("SUM") blocks 30, and high/low select logic block 32. Those of ordinary skill in the art will appreciate that this additional logic associated with PIDs 26 enables controller 12 to accomplish the multi-parameter control functionality that can be done with a single MPC controller such as that designated with reference numeral 50 in FIG. 1.

The design and operation of a conventional controller 12 such as that in FIG. 1 is well understood by those of ordinary skill in the art, and the details of its operation will not be discussed in further detail herein. It is sufficient to state that controller 12 operates in response to various inputs reflecting the state of the system to generate one or more output control signals for adjustment of one or more operational parameters of the system.

With continued reference to FIG. 1, at the top of the control hierarchy, a plant-wide optimizer designated with reference numeral 34 determines optimal steady-state settings for each controlled unit in the plant. These settings may be sent to local optimizers 36 associated with each controlled unit. Such local optimizers may run more frequently or consider a more detailed unit model than is possible at the plant-wide level. Each local optimizer 36 computes control settings corresponding to optimal, economic steady-states and passes this information to a dynamic constraint control system for implementation. As indicated by dashed line 35 in FIG. 1, the dynamic constraint control system comprises high-low select logic block 32, PIDs 26, lead/lag block 28, and summation blocks 30. The dynamic constraint control 35 must move the plant from one constrained steady-state to another while minimizing constraint violations along the way.

Those of ordinary skill in the art will appreciate that in conventional control structures such as that designated with reference numeral 12 in FIG. 1, tuning and design can take considerable engineering effort. This is in part because each PID 26 is general-purpose and is typically only capable of controlling one controlled variable, and as an off-the-shelf component must be tuned for a particular application. MPC is an optimal-control based method in the sense that it determines the optimal control moves by minimizing an objective function. The objective function depends on both the current and predicted future states of the system and the future inputs to the system. The states and the inputs are related through an explicit process model. The theoretical framework which has developed around MPC does not depend on the particular model form and allows for many variations. The models can be linear or nonlinear, continuous-time or discrete time, state-space or input-output, deterministic or stochastic, and more. The flexibility in choosing the type of model provides a powerful advantage to MPC in accordance with the embodiments of the invention disclosed herein.

With continued reference to FIG. 1, within the MPC control structure, the plant-wide optimization represented by block 34 is a system-wide process that is typically conducted less frequently relative to other levels of optimization and control in the overall hierarchy. On the other hand, local optimization represented by blocks 36 in FIG. 1, also known as "real-time optimization" or "RTO," may be conducted somewhat more frequently, for example every 6 hours, or perhaps every 30 minutes or so, depending on the particularities of the system being controlled. The MPC function, represented by block 50 in FIG. 1, is customarily divided into a steady-state calculation and a dynamic calculation, where each of these phases of MPC may be performed every one to two minutes, for example. The dynamic MPC calculation has been studied extensively (see, e.g., S. J. Qin and T. A. Badgwell, "An Overview of Industrial Model Predictive Control Technology," in *Fifth International Conference on Chemical Process Control*, J. C. Kantor, C. E. Garcia, and B. Carnahan, Eds., No. 93 in AIChE Symposium Series 316, 1997, pp. 232–256.). The goal of the steady-state MPC calculation is to recalculate the targets from the local optimizer 36 every time the MPC controller 50 executes, because disturbances entering the system or new input information from the operator may change the location of the optimal steady-state. This separation of the MPC algorithm into a steady-state and dynamic calculation was alluded to, for example, by C. Cutler, A. Morshedi, and J. Haydel, "An Industrial Perspective on Advanced Control," in *AIChE National Meeting*, Washington, D.C., 1983, and is now common in industrial MPC technology. Since the steady-state algorithm must run more frequently than the local optimizers 36, it may use a less detailed model. For example, the steady-state calculation may use a steady-state version of the dynamic model used for the dynamic optimization. The recalculated optimal steady-state is then passed to the dynamic MPC algorithm, which determines how to best go from one constrained steady-state to the next. This steady-state target optimization is an alternative way to incorporate feedback into the MPC algorithm without explicitly including it in the dynamic MPC calculation. In the present disclosure, it will be assumed that the steady-state calculation is driven with a linear economic objective, although it is specifically contemplated that the present invention may be advantageously practiced in applications involving non-linear (e.g., quadratic or higher-order) objective functions.

MPC can be further subdivided into two categories—"nominal MPC" and "robust MPC"—that depend upon the assumptions made about the process model. Nominal MPC assumes a perfect model, while robust MPC accounts for model uncertainty.

At the bottom of the MPC hierarchy is digital control system ("DCS") represented by blocks 52 in FIG. 1. DCS represents the basic, dynamic level of system control, and thus is carried out most frequently of all levels of the hierarchy, for example, every second (or perhaps more often, depending upon the particular application).

Although the issue of model uncertainty in the dynamic optimization has received much attention by researchers, little attention has been paid to how model uncertainty affects the steady-state target calculation.

SUMMARY OF THE INVENTION

Accordingly, the present invention relates to a new formulation of the steady-state target calculation that explicitly accounts for model uncertainty. In accordance with one aspect of the present invention, when model uncertainty is incorporated, the linear program associated with the steady-state target calculation can be recast as a highly structured nonlinear program. In accordance with another aspect of the invention, primal-dual interior point methods can be applied to take advantage of the resulting special structure. For a system having characteristic gain parameters G having a known uncertainty description, the present invention provides a method and apparatus for selecting steady-state targets for said system-manipulated variables such that all system-controlled variables will remain feasible at steady-state for all possible values of the parameters G within the known uncertainty description. A nominal estimate $\tilde{G}$ of the system parameters G is made, and in accordance with another aspect of the invention, the steady-state targets are selected such that when $\tilde{G}$ approaches G, the computed steady-state targets approach the operational steady-state targets that either minimize or maximize the control objective for the true system G, subject to the known uncertainty description. If $\tilde{G}$ equals G, the computed steady-state targets minimize or maximize the control objective for the true system G, subject to the known model uncertainty. (As used herein, the term "extremize" will be used to refer to the mathematical objective of either minimizing or maximizing a particular function, as the case may be.)

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
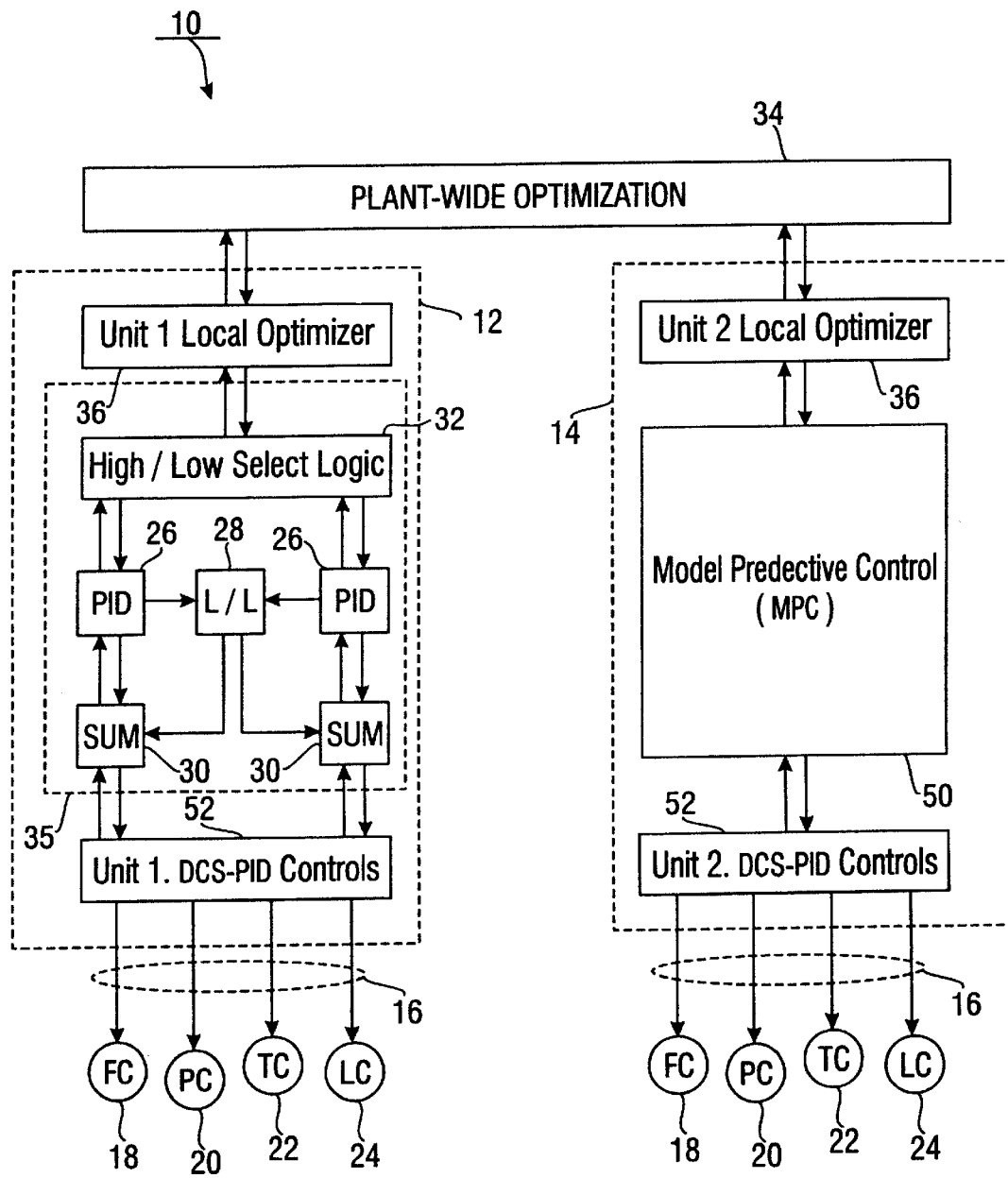
FIG. 1 is a block diagram illustrating the hierarchical control structure of a system employing both a "conventional" control hierarchy and a model predictive control hierarchy.
Figure 2:
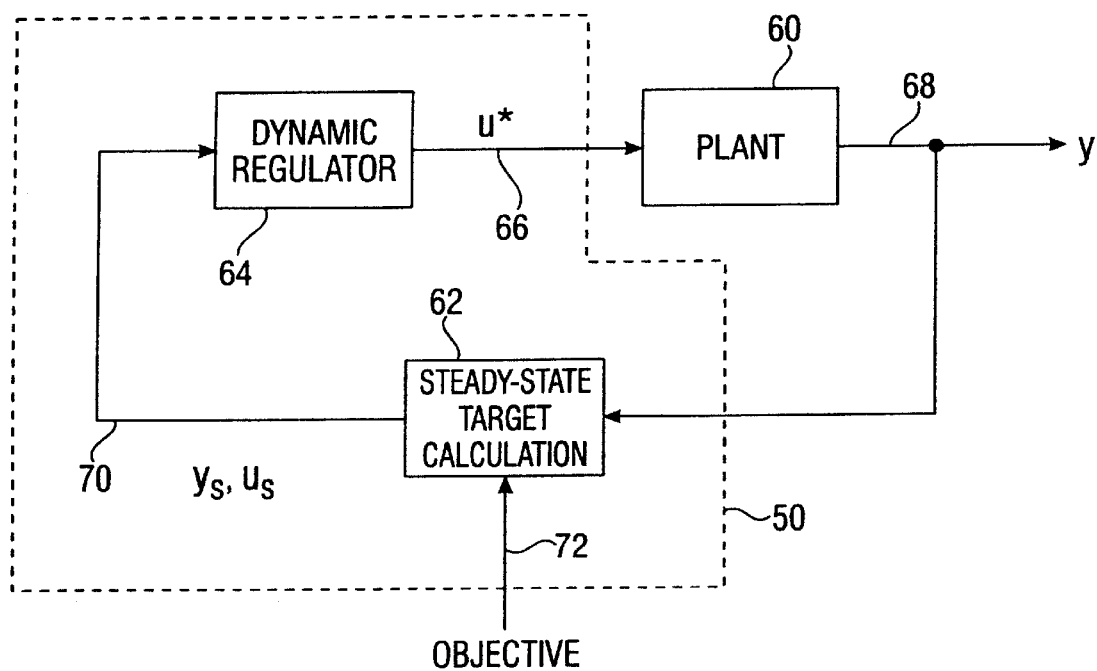
FIG. 2 is a block diagram of an MPC system based on an input/output model.

Referring to FIG. 2, there is shown in block diagram form a implementation of Model Predictive Control (MPC) block 50 from the control hierarchy of FIG. 1. As noted above and as is apparent from FIG. 2, MPC block 50 is divided into a steady-state calculation and a dynamic calculation. A "plant" is also represented by block 60 in FIG. 2. As noted above, as used herein the term "plant" is intended to refer to any of a variety of systems, such as chemical processing facilities, oil refining facilities, and the like, to which those of ordinary skill in the art would appreciate that model predictive control technology may be advantageously applied. The exact nature of plant 60 is not important for the purposes of the present disclosure.

In the interest of clarity, not all features of actual implementations of an MPC controller are described in this specification. It will of course be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the field of controller system design having the benefit of this disclosure.

The steady-state target calculation for linear MPC, represented by block 62 in FIG. 2, takes the form of a linear program ("LP"). The majority of academic literature focuses on the dynamic problem, represented by block 64 in FIG. 2, and not the steady-state problem; it is left to industrial practitioners to investigate issues associated with the steady-state LP. Because most models used in industry are linear, with linear economics driving the controller, the result is an LP. (As noted above, it is contemplated that the present invention may be advantageously practiced in application involving non-linear (e.g., quadratic or higher-order) objectives.) Briefly, the overall system depicted in FIG. 2, comprising model predictive controller 50 and plant 60, operates as follows: MPC 50 performs dynamic and steady-state calculations to generate control signals reflecting optimal "inputs" u* to plant 60. As represented in FIG. 2, inputs u* are carried to plant 60 on line 66. Thus, line 66 in FIG. 2 is representative of what would be, in a "real-world" application of MPC technology, a plurality of electrical control signals applied to controlled components (valves, for example) to control a plurality of controlled variables (pressures, flow rates, temperatures, for example) within the plant.

On the other hand, the plant 60's operation is symbolically represented by a plurality of "outputs" y which are represented in FIG. 2 as being carried on a line 68, thus, line 68 is representative of a plurality of electrical signals reflecting the operational status of plant 60.

Note that in the system of FIG. 2, output(s) y are fed back to be provided as inputs to steady-state target calculation block 62. Steady-state target calculation block 62 operates to generate so-called "target" inputs and outputs $u_s$ and $y_s$, respectively, as a function of plant output(s) y and as a function of an "objective" which is symbolically represented as being applied to calculation block 62 on line 72. The target inputs $u_s$ and $y_s$, are represented in FIG. 2 as being carried on a line 70. Target inputs $u_s$ are those inputs to plant 60 which, based on the calculations made by calculation block 62, are expected based on the MPC modeling of plant 60, to result in plant 60 operating to produce the target outputs $y_s$.

Those of ordinary skill in the art will appreciate that there may be certain real-world constraints or considerations which would make it undesirable for target inputs $u_s$ to be applied directly to plant 60. It is the function of dynamic regulator 64 to derive, as a function of target inputs and outputs $u_s$ and $y_s$, "optimal" inputs u* to plant 60.

A simple example is illustrative of what FIG. 2 represents. In this example, "plant" 60 is a water faucet. "Output" y is a value reflecting the rate of flow of water out of the faucet. The "objective" in this example may be to keep the output (i.e., flow rate) at a particular non-zero value. Given this objective, steady state target calculation block 62 derives target inputs and outputs $u_s$ and $y_s$ that, based on the MPC model, can be expected to achieve outputs y that accomplish the objective. The single "input" in this example would be a value reflecting the extent to which the faucet is turned on. Dynamic regulator 64, in turn, calculates an optimal input u* as a function of target inputs and outputs $u_s$ and $y_s$ that, based on the dynamic calculations of regulator 64, will result in target outputs $y_s$.

The water faucet example illustrates the different roles of steady-state control and dynamic control. Suppose, for example, that the objective for the hypothetical system is to keep the water flowing out of the faucet at a given rate of x $cm^3$/second. Assuming that the system begins operation with the faucet turned off (i.e., y=0 at t=0), steady-state target calculation block 62 would generate a target input us that, based on its MPC model of the faucet, would result in a flow rate of x $cm^3$/second. If this target input were applied directly to the faucet, this would require the faucet to instantly be opened to the extent necessary to achieve the objective flow rate. Those of ordinary skill in the art will appreciate that this may be neither desirable nor possible. Instead, dynamic regulator 64 operates to derive an "optimal" input u* based on the target inputs and outputs $u_s$ and $y_s$ provided on line 70. In the example, the "optimal" input may reflect a more gradual turning on of the faucet. Over time, there may be expected to be a convergence of the "optimal" input u* and the target input $u_s$.

In the foregoing simplistic example, there was but a single input to plant 60 and a single output from plant 60. It is to be understood, however, that in typical embodiments, there are likely to be a plurality of inputs and a plurality of outputs from the plant. In those cases, the values u and y are vectors.

The MPC system depicted in FIG. 2 represents a so-called "input/output" model of control technology. In the input/output model, the current output of the system (i.e., plant 50) is expressed as a function of past inputs to the system. Expressed mathematically, $y_k = f(u_k, u_{k-1}, u_{k-2}, \ldots)$. An alternative model of control technology is known as the "state space" model. In a state space model, the current state of the system is expressed as a function of the previous "state" of the system and the previous input to the system. The "state" of the system, represented by the variable x, is one or more values reflecting the current operational status of the system. The "state" of the system is not strictly speaking the same as the "output" of the system, although the two terms are not altogether dissimilar. There may be state variables which are not outputs from the system or are not even perceptible from outside the system. Expressed mathematically, in the state space model, the current state $x_{k+1}$ is some function F of the previous state $x_k$ and the previous input $u_k$ (that is, $x_{k+1} = F(x_k, u_k)$), while the current output $y_k$ is some function G of the current state $x_k$ (that is, $y_k = G(x_k)$).

Figure 3:
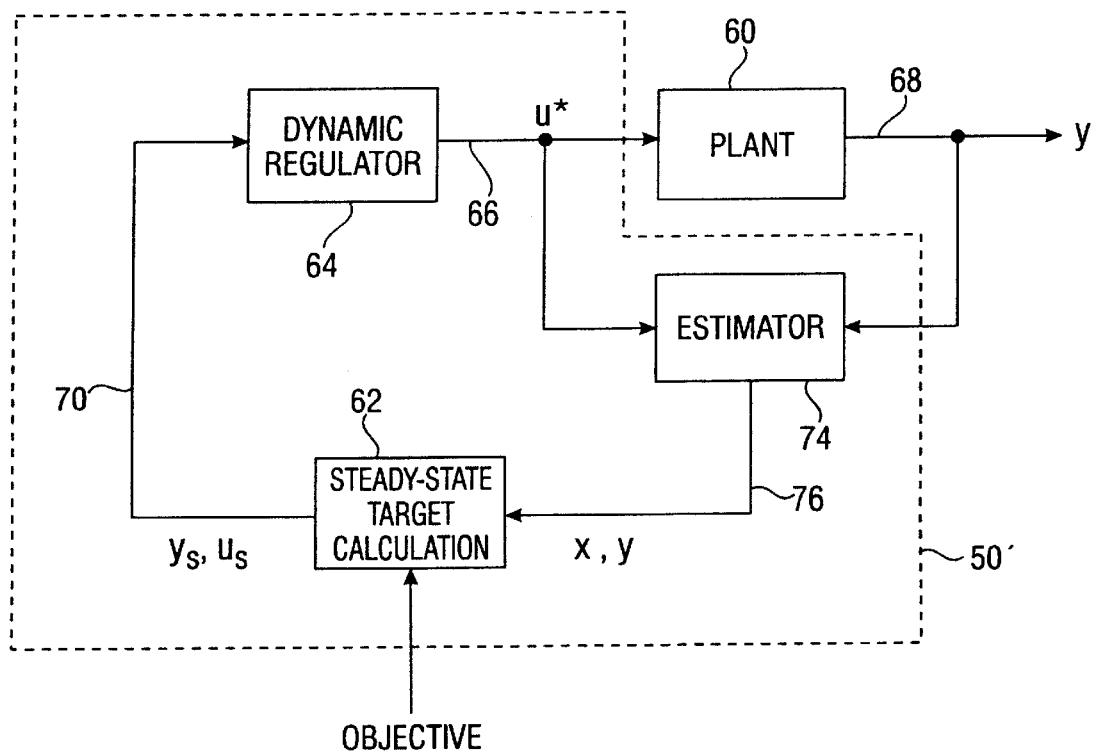
FIG. 3 is a block diagram of an MPC system based on a state space model.

Turning now to FIG. 3, there is shown an MPC system based on the state space model. The system represented in FIG. 3 includes an MPC controller 50' which differs in some respects from controller 50 in FIG. 2, although in the embodiment of FIG. 3, those elements which are substantially the same as in that of FIG. 2 have retained identical reference numerals. The principal difference between controllers 50 and 50' is the inclusion in controller 50' of an estimator block 74 which receives as inputs both the output(s) y of plant 60 on line 68, as well as the "optimal" input(s) u* to plant 60 on line 66. Based on these inputs, estimator 74 calculates and/or estimates the current state of plant 60 and provides this information and the output on line 76 to steady-state target calculator 62.

In the embodiment of FIG. 3, steady-state target calculator 62 calculates target states $x_s$ and/or target outputs $y_s$ and target inputs $u_s$. As in the embodiment of FIG. 2, dynamic regulator 64 uses the output of steady-state target calculator 62 to compute optimal inputs u* to plant 60.

Notably, as will hereinafter become apparent to those of ordinary skill in the art, the present invention is independent of the model used, and may be advantageously practiced in the context of either the input/output model or the state space model. In particular, the present invention relates to the operation of the steady state calculation block 62 in the systems of FIGS. 2 and 3.

Those of ordinary skill in the art will appreciate that any linear model, whether it be state-space, step response, impulse response, or other, can be cast—at steady-state—in the following form:

$$\Delta y = G \Delta u \quad (1)$$

Here $\Delta y = [\Delta y_1 \ldots \Delta y_n]^T \in \Re^{n_y}$ represents the change between the current steady-state output and the last, and $\Delta u = [\Delta u_1 \ldots \Delta u_n] \in \Re^{n_u}$ represents the change between the current steady-state input and the last:

$$\Delta u = u - u_{k-1} \quad (2)$$

$$\Delta y = y - y_{k-1} \quad (3)$$

Here $y = \lfloor y_1 \ldots y_{n_y} \rfloor^T$ and $u = \lfloor u_1 \ldots u_{n_u} \rfloor^T$ are vectors containing the future steady-state outputs and inputs, respectively, and $y_{k-1}$ and $u_{k-1}$ are the previous measured values of y and u. $G \in R^{n_y \times n_u}$ is the steady-state gain matrix for the system. The gain matrix G expresses the sensitivity of or relationship between changes in output to changes in input. The LP tries to find the optimal steady-state targets by minimizing or maximizing (i.e., extremizing) an objective function $J_s$ which may represent, for example, an economic consideration associated with operation of the controlled system:

$$J_s = \sum_{i=1}^{n_u} c_i u_i + \sum_{j=1}^{n_y} d_j y_j \quad (4)$$

while maintaining the relationship of Equation (1) above between the steady-state inputs and outputs, and respecting input and output constraints arising from process specifications:

$$\underline{u_i} \leq u_i \leq \overline{u_i} \quad i=1, \ldots, n_u \quad (5)$$

$$\underline{y_j} \leq y_j \leq \overline{y_j} \quad j=1, \ldots, n_y \quad (6)$$

and ensuring the resulting solution does not force the dynamic MPC calculation to become infeasible:

$$N \Delta \underline{u_i} \leq \Delta u_i \leq N \Delta \overline{u_i} \quad i=1, \ldots, n_u \quad (7)$$

(As used herein, the term "feasible" as applied to system-manipulated (input) variables and system-controlled (output) variables means that the variables do not violate upper and lower constraints arising from predetermined process specifications, such as those set forth in equations (5) and (6) above. Conversely, "infeasible" refers to a violation of these constraints. Such constraints constitute bounds that limit the variables to some previously determined process operating region.)

In Equation (7), N refers to the control horizon of the dynamic MPC calculation, and $\Delta \underline{u_i}$ and $\Delta \overline{u_i}$ are the minimum and maximum bounds for the rate of change constraints in the dynamic MPC calculation. In Equations (5) and (6), $\underline{u_i}$ and $\overline{u_i}$ are minimum and maximum bounds for $u_i$, respectively, with similar notation employed for the outputs $y_i$. Equation (7) ensures the steady-state target is compatible with the rate of change or velocity constraints in the dynamic MPC calculation.

To avoid real-time infeasibilities in the LP, it is common to recast the hard output constraints $\underline{y_j} \leq y_j \leq \overline{y_j}$ in Equation (7) as a soft constraint by adding a so-called "slack" variable $\epsilon = \lfloor \epsilon_1 \ldots \epsilon_{n_y} \rfloor^T \geq 0 \in \Re^{n_y}$ that allows for some amount of violation in the constraint:

$$-\epsilon_j + \underline{y_j} \leq y_j \leq \overline{y_j} + \epsilon_j \quad j=1, \ldots, n_y. \quad (8)$$

The size of the violation is minimized by appending it to the objective function:

$$J_S = \sum_{i}^{n_u} c_i u_i + \sum_{j}^{n_y} d_j y_j + \sum_{j}^{n_y} \epsilon_j. \quad (9)$$

where $c_1$ represents costs or weights of input variables $u_i$ as they relate to the objective function, and $d_i$ represents such costs or weights of output variables $y_i$.

Additionally, in industrial implementations, a bias may be introduced to the model as a result of output feedback. It is assumed that the difference between the model prediction and the measured output at the current time is due to a constant step disturbance at the output. While there are other possible types of disturbance models that can be incorporated into the MPC framework; the present disclosure will concentrate on output disturbance models. The model bias $$b = [b_1 \ldots b_{n_y}]^T \in \Re^{n_y} \qquad (10)$$

is based on a comparison between the current predicted output y and the current measured output $\hat{y} = [\hat{y}_1 \ldots \hat{y}_{n_y}]^T \in \Re^{n_y}$:

$$b = \hat{y} - y. \qquad (11)$$

The bias is added to the model from Equation (1) above:

$$\Delta y = G \Delta u + b. \qquad (12)$$

The problem is then:

$$\min_{u,y,\varepsilon} \sum_i^{n_u} c_i u_i + \sum_j^{n_y} d_j y_j + \sum_j^{n_y} \varepsilon_j \qquad (13)$$

subject to $$\Delta y = G \Delta u + b \qquad (14)$$

$$\underline{u_i} \le u_i \le \overline{u_i}$$

$$N \Delta \underline{u_i} \le \Delta u_i \le N \Delta \overline{u_i}$$

$$-\varepsilon_j + \underline{y_j} \le y_j \le \overline{y_j} + \varepsilon_j$$

$$0 \le \varepsilon_j$$

with i=1, ..., $n_u$ and j=1, ..., $n_y$. The LP is generally considered simpler than the dynamic MPC calculation (which takes the form of a quadratic program) and is commonly solved using the mainstay of linear programming, the simplex method. It is common to calculate the moves Δu and Δy, instead of the inputs and outputs directly. The final nominal steady-state target calculation can be expressed as:

$$\min_{\Delta u, \Delta y, \varepsilon} c^T \Delta u + d^T \Delta y + e^T \varepsilon \qquad (15)$$

subject to $$\Delta y = G \Delta u + b \qquad (16)$$

$$A_u \Delta u \le b_u$$

$$A_y \Delta y \le b_y + \varepsilon$$

$$\varepsilon \ge 0$$

where $$c = [c_1 \ldots c_{n_u}]^T \in \Re^{n_u} \qquad (17)$$

$$d = [d_1 \ldots d_{n_y}]^T \in \Re^{n_y}$$

are vectors composed of the objective function weights. The vector e is a vector of all ones:

$$e = [1 1 \ldots]^T \in \Re^{2n_y} \qquad (18)$$

and $A_u \in \Re^{4n_u \times n_u}$ and $b_u \in \Re^{4n_u}$ are given by $$A_u = \begin{bmatrix} I \\ -I \\ I \\ -I \end{bmatrix} \quad b_u = \begin{pmatrix} \overline{u} - u_s \\ -\underline{u} + u_s \\ N \Delta \overline{u} \\ -N \Delta \underline{u} \end{pmatrix} \qquad (19)$$

while $A_y \in \Re^{2n_y \times n_y}$ and $b_y \in \Re^{2n_y}$ are given by:

$$A_y = \begin{bmatrix} I \\ -I \end{bmatrix} \quad b_y = \begin{pmatrix} \overline{y} - y_s \\ -\underline{y} + y_s \end{pmatrix} \qquad (20)$$

Additionally, since Δy depends linearly upon Δu, the entire problem can be expressed in terms of Δu and ε, reducing the number of decision variables. The resulting LP is cast in standard form and passed to an optimizer. It will be appreciated by those of ordinary skill in the art that the form of $A_y$, $A_u$ and $b_y$, $b_u$ given above are specific examples of matrices that can be used in the problem. However, other forms may also be used. For the purposes of the present disclosure, it will be understood that the form of $A_y$, $A_u$ and $b_y$, $b_u$ may be more general as dictated by the control purpose at hand in a given application. The present disclosure is intended to address a general form of $A_y$, $A_u$ and $b_y$, $b_u$. It is also to be understood that the slack formulation presented is one of many possible ones currently employed by practitioners in the art. It is believed that the present disclosure is applicable to many other possible forms of implementation.

Figure 4:
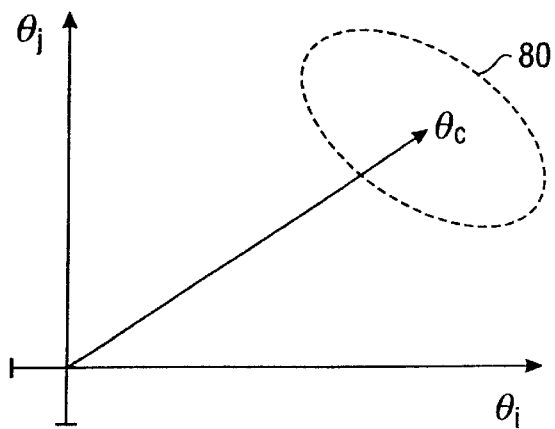
FIG. 4 is a plot illustrating an ellipsoidal uncertainty description or confidence region centered at $\theta_c$ for a system in which the uncertainty in the model parameters $\theta_i$ and $\theta_j$ is assumed to be normally distributed or Gaussian.

The robust LP explicitly accounts for uncertainty in the steady-state gain matrix G of the nominal problem of Equation (15). The mathematical parameterization of possible plants is known as the uncertainty description. It can take many different forms and can be expressed parametrically or statistically. In model identification, if the process noise and model parameters are assumed to be normally distributed or Gaussian variables, the natural uncertainty description is an ellipsoidal bound on the parameters. As illustrated in FIG. 4, the parameter vector $\theta = [\theta_1 \ldots \theta_{n_\theta}]^T \in \Re^{n_\theta}$ is assumed to lie in the set:

$$\theta \in \Theta + e, \text{dus } \Delta\{\theta : (\theta - \theta_c)^T V^{-1} (\theta - \theta_c) \le \alpha\} \qquad (21)$$

describing the joint confidence region. The center of the ellipse $\theta_c$ (designated with reference numeral 80 in FIG. 4) is the mean of the normal distribution and the symmetric matrix V≻0 is the covariance (or estimate of the covariance) of the distribution. (The notation "A≻0" is meant to be read as: "A is positive definite.") The matrix $V^{-1}$ gives the size and orientation of the ellipsoid. In particular, the square roots of the reciprocals of the eigenvalues of $V^{-1}$ are the lengths of the semi-axes of the ellipsoid, and the eigenvectors of $V^{-1}$ are the directions of the semi-axes.

A different form of Equation (21) may in some cases be useful. The confidence region defined by the ellipsoid 80 in Equation (21) and designated with reference numeral 80 in FIG. 4 can be rewritten as:

$$\theta \in \Theta + e, \text{dus } \Delta\{\theta_c + \alpha^{1/2} V^{1/2} s : \|s\| \le 1\} \qquad (22)$$

The term α in the above equations comes from requiring that the parameters be known with a confidence level of $\gamma \in [0, 1]$.

$$\alpha = \Phi^{-1}(\gamma) \qquad (23)$$

Here Φ(x) is the univariate normal distribution function with zero mean and unit variance:

$$\Phi(x) = \frac{1}{\sqrt{2\pi}} \int_{-\infty}^{x} e^{-\frac{1}{2}s^2} ds \tag{24}$$

A value of $\alpha$ is always guaranteed to exist for any $\gamma$, even for the case of when V is only an estimate of the true covariance (see, e.g., Y. Bard, "Nonlinear Parameter Estimation," Academic Press, Inc., New York, 1974). For Equation (22) to remain convex, $\gamma \geq 0.5$, or equivalently, $\alpha \geq 0$. The uncertainty description given by Equation (22) is more general than Equation (15) as it allows V to be rank deficient.

When the covariance matrix V does not have full rank, the ellipsoid becomes degenerate, collapsing in specific directions corresponding to parameters which are known exactly. The directions in which the ellipse collapses correspond to the eigenvectors (or semi-axes) with associated eigenvalues that are zero (i.e. those directions for which a nonzero z produces $V^{1/2}$ z which is zero.) A similar discussion of ellipsoid uncertainty is also given in A. Ben-Tal and A. Nemirovski, "Robust Solutions of Uncertain Linear Programs via Convex Programming," tech. rep., Technion Institution of Technology, Haifa, Israel, 1994 which gives a more formal treatment of the ellipsoid bounds in the general context of convex programming, and in S. Boyd, C. Crusius, and A. Hansson, "Control Applications of Nonlinear Convex Programming," *Journal of Process Control*, (1998), which proposes the use of ellipsoid uncertainty descriptions for use in optimal control. In the steady-state target calculation, the uncertainty parameters $\theta$ are the elements of the steady-state gain matrix G. Let $g_1$ be the column vector describing the $i^{th}$ row of G:

$$G = [g_1 g_2 \ldots g_{n_y}]^T \tag{25}$$

Assume that outputs are perturbed by independent random variables. No output is correlated to another. In this case a block diagonal covariance matrix can be constructed for the process gains made up of the individual covariance matrices for each row of the gain matrix. In particular, if $V_1$ is the covariance matrix corresponding to the $i^{th}$ row, then the covariance for the entire matrix is given by $$V = \begin{bmatrix} V_1 & & & \\ & V_2 & & \\ & & \ddots & \\ & & & V_{n_y} \end{bmatrix} \tag{26}$$

If the outputs are actually cross-correlated, then the off diagonal elements of V will be nonzero. In any case, it can be assumed without loss of generality that g is nominally $\tilde{g}$ and has covariance V, yielding:

$$g \in \xi \underline{\Delta} \{\tilde{g} + \alpha^{1/2} V^{1/2} s : \|s\| \leq 1\} \tag{27}$$

where $\xi$ defines the ellipsoid for the entire matrix. This is the most natural way to pose the problem as it results in constraint-wise uncertainty. In the nominal LP, the gain matrix G is premultiplied by the (possibly dense) matrix $A_y$ in the output constraint. This results in a linear combination of outputs. The $i^{th}$ component of the output constraint is given by $$\sum_j a_{ij} g_j^T \Delta u \leq b_{y_i} \tag{28}$$

In the general case, ellipsoids of the type above are required to capture the uncertainty in the constraint. If, however, most of the elements of $A_y$ are zero, as is the case for simple bounds on the outputs, it is possible to simplify the elliptic uncertainty description.

For simple bounds, there is a constant scalar factor $\beta$ premultiplying the $i^{th}$ constraint.

$$\beta g_i^T \Delta u \leq b_{y_1} \tag{29}$$

Each component of the constraint depends only upon a single row of the gain matrix. Thus an ellipsoid can be defined for only a single row. Let the gain for the $i_{th}$ row nominally be $\tilde{g}_i$. The covariance is $V_i$. The ellipsoid is given by:

$$g_i \in \tilde{\xi}_i \underline{\Delta} \{g_1 + \alpha^{1/2} V_i^{1/2} s : \|s\| \leq 1\} \tag{30}$$

Additionally, there are times when it is desirable to approximate the ellipsoidal uncertainty as either a polytope or simple box.

Figure 5:
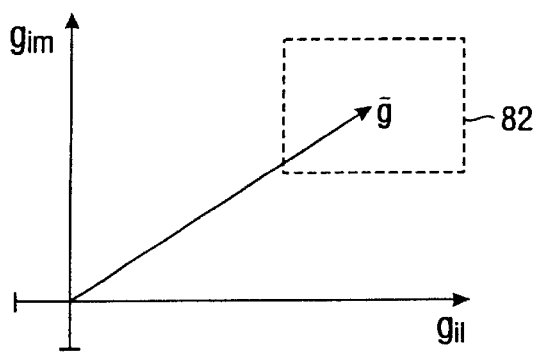
FIG. 5 is a plot illustrating a rectangular or "box" approximation of an ellipsoidal confidence region for the model parameters (gains) $g_{im}$ and $g_{i1}$ centered at $\tilde{g}$.

If the ellipsoidal constraint can be interpreted in terms of a joint confidence region, then the box constraint can be interpreted in terms of joint confidence intervals (or as approximations to the ellipse). A simple box constraint, designated with reference numeral 82 in FIG. 5, gives the minimum and maximum bounds of the ellipse. More complicated polytopes may also be used in an attempt to approximate the ellipse. A general polytope, including box constraints, can be expressed as bounds on some linear combination of the elements $g_{1j}$ of G. The uncertainty description $\beta$ is then given by:

$$g \in \beta \underline{\Delta} \{g : A_g g \leq b_g\} \tag{31}$$

Box constraints, when used to approximate elliptic constraints, are more conservative than ellipsoidal constraints and in turn lead to a more conservative control action. The ellipsoid and box constraints described by Equations (27), (30), and (31) each describe a possible uncertainty description U defining realistic values of the gains for use in the robust LP.

As an illustrative example of the robust LP concept, consider the linear steady-state system:

$$\Delta y = G \Delta u \tag{32}$$

with $\Delta u \in \Re^2$ and $\Delta y \in \Re$. Let the nominal value of g be:

$$\tilde{g} = \begin{bmatrix} 1.00 \\ 0.75 \end{bmatrix} \tag{33}$$

Because there is only one output, $g = g_1$ and $\epsilon = \epsilon_1$. The variance for the problem is:

$$V = \begin{bmatrix} 0.03 & -0.05 \\ -0.05 & 0.40 \end{bmatrix} \tag{34}$$

For the present example, the bias and slack variables are ignored. It is necessary that the matrix elements be known with a probability level $\gamma$ of 99%, which corresponds to α=2.33. The ellipsoid uncertainty can be approximated as box constraint with the following data:

$$A_g = \begin{bmatrix} 1 & 0 \\ 0 & 1 \\ -1 & 0 \\ 0 & -1 \end{bmatrix} \quad b_g = \begin{pmatrix} 1.26 \\ 1.71 \\ -0.74 \\ 0.21 \end{pmatrix} \quad (35)$$

Figure 6:
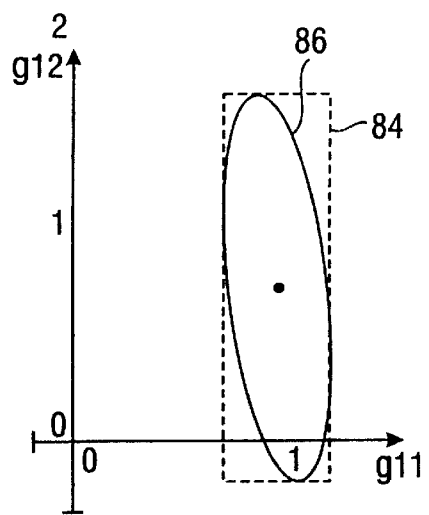
FIG. 6 is a plot illustrating an ellipsoidal confidence region and a corresponding box approximation thereof.

The ellipsoid uncertainty description and its box approximation are illustrated in FIG. 6, where the ellipsoid uncertainty description is designated with reference numeral 84 and the box approximation is designated with reference numeral 86.

A problem arises when considering output constraints in the nominal problem of Equation (15). The constraints can correspond to critical variables—the temperature limit on a reactor vessel or the maximum allowable feed rate into a unit, for example. Uncertainty or "fuzziness" in the constraint means that even though the nominal value may be binding at the upper or lower limit, the actual value may be outside the constraint region. To see this, the following constraints may be added to the example:

$$-4 \leq \Delta u_1 \leq 4 \quad (36)$$

$$-3 \leq \Delta u_2 \leq 1$$

$$-2 \leq \Delta y_1 \leq 4$$

Figure 7:
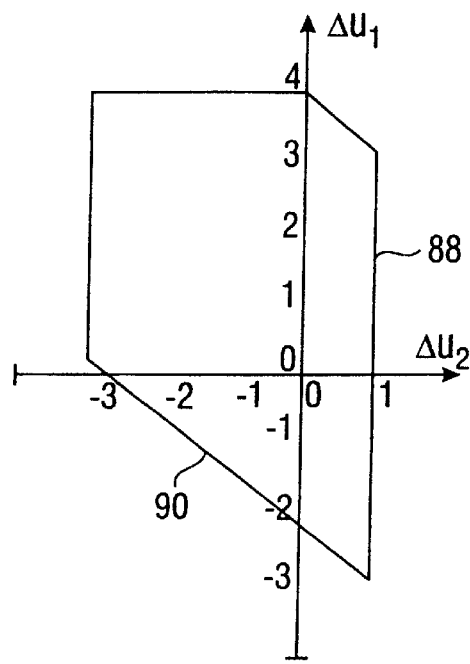
FIG. 7 is a representation of a feasible region for the solution of a linear programming problem having two independent variables.

The feasible region defined by the constraints corresponds to the interior of the polygon designated with reference numeral 88 in FIG. 7. This region 88 assumes nominal values for the gains.

The lower diagonal line, designated with reference numeral 90 in FIG. 7 describes the lower bound on the output $\Delta y_1 \geq -2$. The line 90 is given by:

$$g_{11}\Delta u_1 + g_{12}\Delta u_2 + 2 = 0 \quad (37)$$

Figure 8:
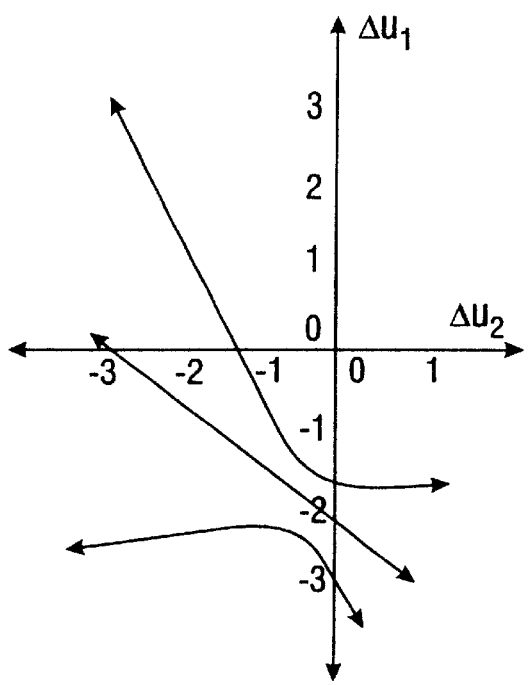
FIG. 8 is a plot showing the uncertainty bounds for a constraint in the linear programming problem whose feasible region is shown in FIG. 7.
Figure 9:
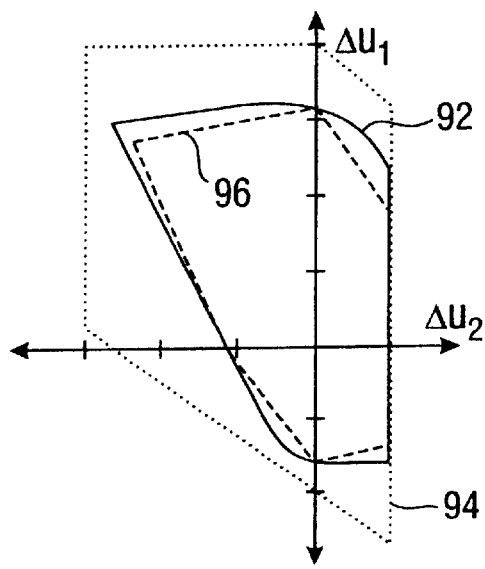
FIG. 9 is a plot showing the feasible region of FIG. 7 reduced by including the uncertainty bounds of the type shown in FIG. 8 for all constraints in the linear programming problem and showing a linear (box) approximation of the reduced feasible region.

Uncertainty in g causes there to be uncertainty in the constraint. FIG. 8 shows the nominal constraint and its confidence bounds. Consider the case in which the constraint is binding. Uncertainty could force the true process to lie anywhere within the confidence limits, meaning it could easily lie outside of the feasible set. The equation describing the bounds is given by:

$$\tilde{g}^T \Delta u \pm \alpha^{1/2} \|V^{1/2} \Delta u\| + 2 = 0 \quad (38)$$

where $\|\cdot\|$ is the standard Euclidean norm. Every output constraint will contain some degree of uncertainty. If the uncertainty from the upper constraint $\Delta y_i \leq 4$ is included, the plot of the boundary of the new feasible set is as shown in FIG. 9. The boundary is given by the solid line designated with reference numeral 92. FIG. 9 shows the original feasible region as the dotted line designated with reference numeral 94 and the box uncertainty approximation of the ellipsoid as the dashed line designated with reference numeral 96. Box uncertainty will always lead to a more conservative control action than ellipsoid uncertainty. The box uncertainty description contains extraneous gains or plants that are not physically realizable. As the controller is required to consider more and more possible plants, corresponding to an increase in the size of the uncertainty description, and accordingly robustness, the size of the feasible region will decrease, corresponding to a more conservative controller. This is the familiar robustness/performance tradeoff.

The feasible region can be defined as the set of inputs which produce feasible outputs for any possible value of the gains:

$$\Delta u \in \left\{ \Delta u : \begin{array}{c} A_y \Delta y = A_y G \Delta u \leq b_y, \forall\ G \in U \\ A_u \Delta u \leq b_u \end{array} \right\} \quad (39)$$

where U is one of the uncertainty descriptions discussed above. In addition to gain uncertainty affecting the constraints, it also has an effect on the objective function:

$$J_S = c^T \Delta u + d^T \Delta y \quad (40)$$

$$= c^T \Delta u + d^T G \Delta u.$$

Let the gradient of the objective with respect to the inputs be $f$:

$$\nabla J_s = f = c + G^T d \quad (41)$$

For the present example, assume c and d are given by:

c=[7.00 5.00]$^T$ and d=[−6.00].

Uncertainty causes the value of $f$ to change. $f$ is nominally $\bar{f}$:

$\bar{f}$=[1.00 0.50]$^T$ and can take on values anywhere between $\underline{f}$ and $\bar{f}$:

$\underline{f}$=[−0.56 2.56]$^T$ $\bar{f}$=[−5.26 6.26]$^T$.

Figure 10:
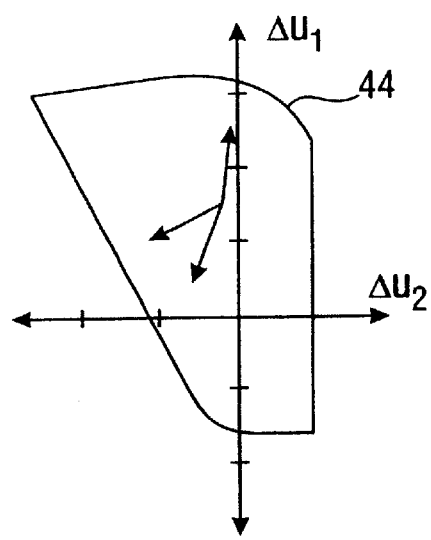
FIG. 10 is a plot showing possible descent directions within the reduced feasible region of FIG. 9.

FIG. 10 shows the effect of this uncertainty in the objective function. As the objective function changes, the solution of the LP changes. One solution is to include the gains in the objective, minimizing them in some sense. From a control viewpoint, however, this may not be desirable. An alternative control policy would be to minimize the "best guess" or nominal value of the gain. The goal is to drive the process toward the economic optimum using the best guess for the gain of the process but restrain the inputs to only those that ensure the process will remain feasible for any reasonable gains (those captured by the uncertainty description). If the nominal value of the gain is used, the objective function for the robust LP becomes:

$$J_s = c^T \Delta u + d^T \tilde{G} \Delta u + e^T \epsilon \quad (42)$$

Although the example is simple, it illustrates the nature of the problem. Model uncertainty forces the problem structure to change. The linear constraints so commonly used in control theory become nonlinear.

In the foregoing example, it was possible to graphically determine the optimal solution. In practice, there is a need to solve the following optimization problem:

$$\min_{\Delta u, \epsilon} 42)c^T \Delta u + d^T \tilde{G} \Delta u + e^T \epsilon \quad (43)$$

subject to

-continued $$A_y G\Delta u \leq b_y + \varepsilon - A_y b, \forall G \in U \quad (44)$$

$$A_u \Delta u \leq b_u$$

$$\varepsilon \geq 0$$

Equations (43) and (44) constitute the robust LP in accordance with the presently disclosed embodiment of the invention. The robust LP is preferably solved at every time-step during the execution of the MPC algorithm. Solution times are preferably on the order of tens of seconds (or less) for it to be used in a real-time setting. Its solution is passed as targets to the dynamic MPC calculation block (block 64 in the exemplary embodiments of FIGS. 2 and 3). The problem has been cast in terms of only $\Delta u$ and $\varepsilon$, having removed the problem dependency on $\Delta y$. This has done herein for the sake of simplicity and to illustrate the structure of the problem. Those of ordinary skill in the art will appreciate that the problem can just as well be written so that the outputs appear explicitly as an equality constraint.

Next, it is desirable to formulate the optimization problem of Equations (43) and (44) as an optimization problem over a second-order cone. To illustrate this, only the simpler problem of the following Equation (45) need be considered:

$$\min_x c^T x \quad (45)$$

subject to $$AGx \leq b, \forall G \in U$$

which is actually a semi-infinite program. A semi-infinite program generally has the following form:

$$\min_x f(x) \quad (46)$$

$$h(x, \theta) \leq 0 \text{ for all } \theta \in U$$

with $f: \Re^n \to \Re$ and h: $\Re^n \times \Re^m \to \Re^p$. $\theta$ is generally a set of parameters and, for most engineering problems U is closed and convex. The vector x is finite while the set U is infinite. A finite number of variables appear in infinitely many constraints. The problem of Equation (47) occurs in many different fields ranging from robotics to structural design. R. Hettich and K. Kortanek, "Semi-infinite programming: Theory, Methods and Applications," *SIAM Review*, 35 (1993), pp. 380–429 provides a review of various areas to which semi-infinite programming has been applied as well as current theory and solution methods.

The most straightforward way to handle constraints of the type in Equation (47) is to note that:

$$h(x,\theta) \leq 0 \forall \theta \in U \quad (47)$$

is equivalent to $$\max_\theta (h(x, \theta), \theta \in U) \leq 0 \quad (48)$$

If the following definition is used $$H(x) \triangleq \frac{\max}{\theta} h(x, \theta) \quad (49)$$

$$\theta \in U$$

then the semi-infinite program in Equations (46) and (47) becomes:

$$\min_x f(x) \quad (50)$$

$$H(x) \leq 0$$

For different engineering problems, H(x) can be differentiable or non-differentiable depending upon the nature of the constraint and parameter set. The review by E. Polak, "On the Mathematical Foundations of Non-differentiable Optimization in Engineering Design," *SIAM Review*, 29 (1987), pp. 21–89, discusses this problem class in the framework of engineering design when H(x) is non-differentiable, and the review by Hettich and Kortanek cited above discusses the case when H(x) is differentiable. Optimization techniques must be tailored for each problem.

Many robust optimization problems can be cast as semi-infinite optimization problems. For some classes of problems the constraint of Equation (48) is interpreted in a stochastic framework. The goal is to satisfy the constraint in a probabilistic sense:

$$prob(h(x,\theta) \leq 0) \geq \gamma \quad (51)$$

with $\theta \in \Re^m$ a randomly distributed variable with a given mean and variance. This classical way of dealing with uncertainty as a probabilistic constraint is known as stochastic programming. In fact, most robust optimization problems first arise as stochastic optimization problems. Stated simply, each paradigm is common to a specific field. Stochastic programming is more commonly used in the fields of operations research and managerial science, while semi-infinite programming is applied more often to engineering problems. Both, however, have common underlying themes. This is especially the case in the robust LP. A more detailed discussion of stochastic programming may be found in A. Prekopa, *Stochastic Programming*, Kluwer Academic Publishers, Boston, 1995, chapters 10–11, and in P. Kall and S. W. Wallace, *Stochastic Programming*, John Wiley and Sons, New York, 1994, chapter 4. R. Hettich and K. Kortanek, "Semi-Infinite Programming: Theory, Methods and Applications," *SIAM Review*, 35 (1993), pp. 380–429, although written in German, is an excellent source for information on semi-infinite programming.

Before discussing the case of ellipsoid uncertainty in the robust LP, consider the simpler case when the ellipsoids are approximated by box constraints. If the goal of a semi-infinite optimization is to minimize a linear function subject to a set of linear constraints when there is uncertainty in the problem data, the semi-infinite LP can be cast as a standard LP with more constraints. If it is assumed that the uncertain parameter $\theta$ corresponds to the elements of the matrix A and the goal is to:

$$\min_x c^T x \quad (52)$$

subject to $$Ax \leq b \ \forall A \in B$$

where $b \in \Re^m$ and $x \in \Re^n$, then a straightforward way to solve the problem is to simply enumerate all the possible values of A. The reason this is a valid approach relies on the fact that the solution of an LP will always lie on the boundary of the feasible set. Thus, by enumerating all the possible values, the semi-infinite problem can be replaced by a finite problem with an increased number of inequality constraints. For every constraint i=1, ..., m, there are $2^n$ possible entries, created by replacing the elements with their upper and lower bounds respectively. Doing so replaces the previous problem with the following problem with m $2^n$ constraints:

$$\min_x c^T x \quad (53)$$

subject to $$A^* x \leq b$$

If in the present example, there are $n_u$ inputs and m constraints on the outputs, there are $m2^{n_u}$ extra constraints that must be added to the problem. For a 10×10 system with simple bounds on the outputs, this corresponds to over twenty thousand constraints. The problem size grows exponentially.

When the semi-infinite problem of Equation (47) is convex with the constraints appearing as cones, it has been shown that the problem can be recast as a finite dimensional convex optimization. See, e.g., the Ben-Tal and Nemirovski citations above. This is based in part on Y. Nesterov and A. Nemirovsky, "Interior-Point Polynomial Methods in Convex Programming," *Studies in Applied Mathematics*, vol. 13, SIAM, Philadelphia, Pa., 1994, which introduces the idea of a second-order cone representable function (in other words, a function that can be cast as a second-order cone). It has been shown that a semi-infinite optimization with a second-order cone representable constraint can be better interpreted as an optimization over a second-order cone.

A general second-order cone program ("SOCP") has the following form:

$$\min_x c^T x$$
$$\|A_i x + b_i\| \leq c_i^T x + d_i, i = 1, \ldots, N$$
$$Gx = g,$$

where $x \in \Re^n$, $b_i \in \Re^m$, and $g \in \Re^p$. Again, $\|\cdot\|$ is the standard Euclidean norm; and $A_i$, c, $c_i$, $d_i$, and G, are of appropriate dimension. A wide variety of nonlinear convex optimization problems can be cast as SOCPs, including linear programming and quadratic programming as special cases. The robust LP falls into this category.

The are two perceived advantages to casting the robust LP in this form: First, the original semi-infinite optimization is recast in the form of a standard optimization problem with a finite constraint set.

Second, there has been tremendous activity in extending primal-dual interior-point methods to this more general problem class—resulting in new efficient solution methods.

One example of a reference discussing interior-point methods for second-order cone programming is the text by Nesterov and Nemirovsky cited above. Boyd, Crusius and Hansson, also cited above, shows how SOCPs can be used in optimal control. The latter describes a robust optimal control problem in which the $l_\infty$ norm of the cost function (i.e. the peak tracking error) is minimized for uncertain impulse response coefficients in a finite impulse response model. This reference also discusses how the problem can be solved efficiently as a SOCP. This reference further illustrates how SOCPs can be used in the optimal design of feedback controllers. These applications are based on the fact that an uncertain linear constraint can be cast as a second-order cone. Ben-Tal and Nemirovski, cited above, consider the general linear program:

$$\min_x c^T x \quad (54)$$

subject to $$a_i^T x \leq b_i \ \forall \ a_i \in \xi_i, i = 1, \ldots, m$$

with uncertainty in the data $a_i$ described by an ellipsoid $$a_i \in \xi_i + e, \text{dus } \Delta\{\tilde{a}_i + \alpha^{1/2} V_i^{1/2} s: \|s\| \leq 1\} \quad (55)$$

From semi-infinite programming, the constraint above is equivalent to a maximization over the ellipsoid:

$$\max\{a_i^T x - b: a_i \in \xi_i\} = \tilde{a}_i^T x + \alpha^{1/2} \|V_i^{1/2} x\| \leq b_i, \quad (56)$$

which is nothing other than a second-order cone. The result is the following robust LP:

$$\min_x c^T x \quad (57)$$

subject to $$\tilde{a}_i^T x + \alpha^{1/2} \|V_i^{1/2} x\| \leq b_i$$

for $i = 1, \ldots, m$

It has been known for some time by those of ordinary skill in the art of stochastic programming that a probabilistic random linear constraint (i.e. Equation (51) for linear h(x,θ) and a normal distribution) can be cast as an equivalent nonlinear constraint. However, the nonlinear equivalent was not recognized as a second-order cone. M. S. Lobo, L. Vandenberghe, S. Boyd, and H. Lebret, in "Applications of Second-Order Cone Programming," *Linear Algebra Appl.*, (1998), in a summary of SOCP applications, makes this connection explicit.

Consider the linear probabilistic constraint:

$$\text{prob}(a_i^T x \leq b_i) \geq \gamma \quad (58)$$

If $a_i$ has mean $\tilde{a}_i$ and covariance $V_i$, then $a_i^T x$ has mean $\tilde{a}_i^T x$ and variance $x^T V_i x$. The constraint can be written as an equivalent constraint with zero mean and unit variance:

$$\text{prob}\left(\frac{a_i^T x - \tilde{a}_i^T x}{\sqrt{x^T V_i x}} \leq \frac{b_i - \tilde{a}_i^T x}{\sqrt{x^T V_i x}}\right) \geq \gamma \quad (59)$$

Thus the probability can be given by:

$$\Phi\left(\frac{b_i - \tilde{a}_i^T x}{\sqrt{x^T V_i x}}\right) \geq \gamma \quad (60)$$

or, equivalently, $$\tilde{a}_i^T x + \Phi^{-1}(\gamma) \|V_i^{1/2} x\| \leq b_i \quad (61)$$

which is a second-order cone constraint. While this is a special case of the general probabilistic constraint, it is still very important. A general probabilistic constraint (Equation 51) is very computationally expensive since it involves a semi-infinite, multivariate probability integral to evaluate the associated probability distribution function. Those of ordinary skill in the art will appreciate that a second-order cone, on the other hand, can be evaluated quite efficiently.

The robust steady-state target calculation can now be calculated probabilistically. The semi-infinite constraint in $$\min_{x} c^T x \quad (62)$$

subject to $$AGx \leq b, \forall\ G \in U,$$

can be thought of as requiring the output constraints to hold for some uncertainty in the process gains to a probability $\gamma$.

To see this explicitly, the semi-infinite constraint can be re-written component-wise:

$$\sum_{j} a_{ij} g_j^T x \leq b_i \quad G \in U, i = 1, \ldots, m. \quad (63)$$

which can be rewritten as $$g^T(D_i x) \leq b_i \forall g \in \xi \quad (64)$$

where $D_i$ is defined by:

$$D_i = [diag(a_{i1} e)\ diag(a_{i2} e) \ldots diag(a_{im} e)]^T \quad (65)$$

and g is the vector of the rows of G stacked lengthwise. The uncertainty description U has been taken to be the ellipsoidal uncertainty description $\xi$. From Equation (57), the constraint becomes:

$$\tilde{g}^T(D_i x) + \alpha^{1/2} \|V^{1/2} D_i x\| \leq b_i \quad (66)$$

which is a second-order cone.
The result is the following problem:

$$\min_{x} c^T x \quad (67)$$

subject to $$\tilde{g}^T(D_i x) + \alpha^{1/2} \|V^{1/2} D_i x\| \leq b_i$$

for $i = 1, \ldots, m$.

The full robust steady-state target calculation can now be cast in model predictive control (Equation (43)) as a SOCP:

$$\min_{\Delta u, \varepsilon} c^T \Delta u + d^T \tilde{G} \Delta u + e^T \varepsilon \quad (68)$$

subject to $$\tilde{g}^T(D_i \Delta u) + \alpha^{1/2} \|V^{1/2} D_i \Delta u\| + a_i^T b \leq b_{yi} + \varepsilon_i \quad (69)$$
$$A_u \Delta u \leq b_u$$
$$\varepsilon \geq 0.$$
for $i = 1, \ldots, m$.

Consider an example to illustrate the nature of the robust LP. The present example shows instances when, because of model mismatch, the targets calculated by the nominal LP result in poor control, while the targets calculated by the robust LP provide much improved control.

Consider the simple single-input, single-output (SISO) steady-state model given by:

$$(y_k - y_{k-1}) = g(u_k - u_{k-1}) + b,$$

where $u_k$ and $y_k$ are the input and output, respectively, at time k, g is the model gain, and b is the model bias. Assume that the gain is nominally $$\tilde{g} = \frac{1}{2}$$

but the true plant gain is given by $$g_{act} = 2$$

which is assumed to lie in some ellipsoid. Also, assume unit constraints on the input and output:

$$-1 \leq y \leq 1$$
$$-1 \leq u \leq 1$$

The objective is given by:

$$J_s = u - 3y.$$

Figure 11:
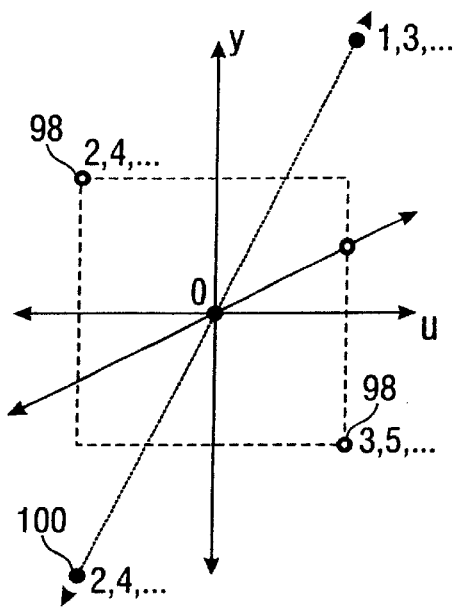
FIG. 11 is a plot showing a sequence of actual and nominal solutions for a linear programming problem with gain mismatch.
Figure 12:
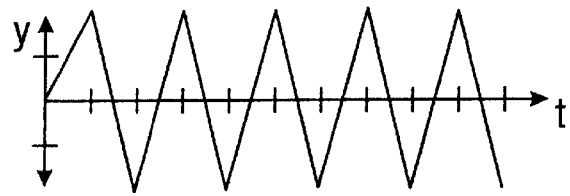
FIG. 12 is a plot showing input and output behavior over time for the nominal solution to the linear programming problem of FIG. 11.

If the dynamic MPC calculation is stable and process dynamics are such that the controller can drive the system to steady-state within one time step, then cycling will occur in the controller. FIG. 11 is a phase portrait of the controller. The objective is such that the controller wants to drive the process to large outputs and small inputs. If the nominal model were correct, the optimal steady-state operating point would be at (u, y)=(1, ½). In FIG. 11, the open circles designated with reference numerals 50 correspond to the predicted input and output. The filled circles designated with reference numerals 100 correspond to the actual input and output. The numbers next to each circle indicate the time-step at which the values occur. If at time zero, the plant is at the origin, then at the first time-step the model predicts the plant should lie at (1, ½). But because of mismatch, once the input is injected, the true plant is at (1, 2). Now bias is included in the model. This equivalently raises the nominal model line such that its intercept is at 3/2. The optimal solution (using the model) for this time-step is at (−1, 1). Once again, because of model error, the true plant is actually at (−1, −2). The new input moves the process in the opposite direction, which ultimately forces the controller to cycle. This cycling is illustrated in FIG. 12, where the inputs y and outputs u are plotted as a function of time. If on the other hand, something is known about the value of the true gain, the process could be controlled more efficiently. For example, if it is known to a 95 percent probability that gain was between 2 and 0.5, then the robust LP can be used to find the input for which any output will remain feasible. The only solution is (u, y)=(½, 1).

Figure 13:
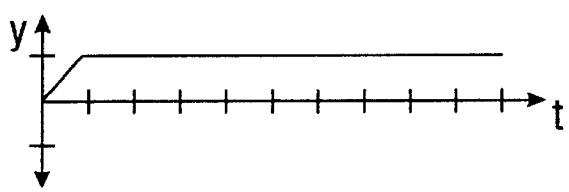
FIG. 13 is a plot showing input and output behavior over time for a robust solution to the linear programming problem of FIG. 11.

The steady-state targets for the robust LP are shown in FIG. 13. While this example is somewhat pathological, it demonstrates the importance of addressing uncertainty in the steady-state target calculation. In particular, the example set forth above with reference to FIGS. 11 through 13 illustrates how, as the nominal gain approaches the true gain, steady-state target values computed in accordance with the presently disclosed embodiment of the invention approach values that extremize the objective function for the system, subject to the known uncertainty description, and that, if the nominal gain equals the true gain, the computed target values extremize the objective function, subject to the known uncertainty description.

When uncertainty is included in the linear program associated with the steady-state target calculation in model predictive control, the result is a second-order cone program.

By explicitly including model uncertainty, the SOCP can efficiently remove cycling in the steady-state controller due to modeling error. In some cases, this can be accomplished with almost no performance penalty.

The robust LP includes quadratic objective functions in addition to linear objective functions. Consider the following optimization problem, which is an extension of Equation (69):

$$\min_x x^T Q x + 2c^T x \qquad (70)$$

subject to $$\tilde{g}^T(D_i x) + \alpha^{1/2} \|V^{1/2} D_i x\| \le b_i$$

for $i = 1, \ldots, m$ where the matrix Q is positive-definite and symmetric matrix that allows for weighting of system dependent variable slacks and/or other decision variables. The above optimization can be expressed equivalently as follows:

$$\min_{x,t} t \qquad (71)$$

subject to $$\|Q^{1/2} x + Q^{-1/2} c\| \le t,$$

$$\tilde{g}^T(D_i x) + \alpha^{1/2} \|V^{1/2} D_i x\| \le b_i$$

for $i = 1, \ldots, m$.

The optimization problem (Equation (71)) is a second-order cone program ("SOCP") of the same form as the general SOCP described on page 26. It can be expressed and solved in a form identical to that of Equation (68). For a QP objective the equation takes the following form:

$$\min_{\Delta u, \varepsilon} c^T \Delta u + d^T G \Delta u + e^T \varepsilon + \Delta u^T Q_0 \Delta u + \varepsilon^T Q_1 \varepsilon \qquad (72)$$

subject to $$\tilde{g}^T(D_i \Delta u) + \alpha^{1/2} \|V^{1/2} D_i \Delta u\| + a_i^T b \le b_{yi} + \varepsilon_i$$

$$A_u \Delta u \le b_u$$

$$\varepsilon \ge 0.$$

for $i = 1, \ldots, m$.

Those of ordinary skill in the art will appreciate that the various optimization "processes" described herein, such as those represented by local optimizer block 36, MPC block 50, and DCS-PID block 52 in FIG. 1, are controller processes that are implemented on one or more computer-based systems constituting the physical embodiment of those respective processes. For example, in one embodiment of the invention, control functions such as MPC process 50 may be implemented as a computer program (i.e., a collection of computer routines) executed on a suitable computer platform, such as a VAX or ALPHA computer system, available from Digital Equipment Corporation, Maynard, Mass. (now owned by Compaq Computer Corporation, Houston, Tex.). Alternatively, MPC process 50 may be advantageously implemented on a reduced instruction set computer (RISC), multiprocessor system, such as are commercially available from a number of manufacturers such as International Business Machines Corp., Armonk, N.Y.

The one or more computers embodying the MPC control system in accordance with the presently disclosed embodiment of the invention are adapted to interface with the various subsystems to be controlled ("controlled subsystems") within a controlled system, such as a processing plant or the like.

As noted above, the invention may be implemented in part by programming a computer processor. The programming may be accomplished through the use of a program storage device readable by the processor that encodes a program of instructions executable by the processor for performing the operations described above. The program storage device may take the form of, e.g., a floppy disk; a CD-ROM; a memory device (e.g., RAM, ROM, EPROM, EEPROM, etc.); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The program storage device may be one that is directly readable by the processor, or it may be one that is unusable by the processor per se but that provides intermediate storage of the program of instructions. The program of instructions may be read directly from the program storage device by the processor; alternatively, the program of instructions may be temporarily or permanently stored in the program storage device and transmitted from it to the processor over one or more links, e.g., over a telephone connection (such as a modem connection or an ISDN line); over a cable-modem hookup; over the Internet; via radio- or satellite transmission; etc., possibly with other program storage devices providing intermediate storage along the way. The precise forms of the program storage device and of the encoding of instructions are immaterial here.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of controlling a system in accordance with an objective function J, the operation of said system being describable by an equation $\Delta y = G \Delta u$, where y represents one or more system-controlled output variables, u represents one or more system-manipulated input variables, G represents system gain parameters, and where J is a function of G, said method comprising the steps of:

(a) modeling said system according to an equation $\Delta y = \tilde{G} \Delta u$, where $\tilde{G}$ is a nominal estimate of G and has a known uncertainty description and where $\tilde{J}$ is said objective function J applied to $\tilde{G}$;

(b) computing steady-state targets for said system-manipulated variables u including extremizing said objective function J cast as a quadratic program, such that all of said system-controlled variables will remain feasible at steady-state for all possible values of the system parameters within said known uncertainty description; and (c) using the computed steady-state targets for system-manipulated variables u to control the system.

2. A method of controlling a system in accordance with an objective function J, the operation of said system being describable by an equation $\Delta y = G \Delta u$, where y represents one or more system-controlled output variables, u represents one or more system-manipulated input variables, and G represents system gain parameters, said method comprising the steps of:

(a) modeling said system according to an equation $\Delta y = \tilde{G}\Delta u$, where $\tilde{G}$ is a nominal estimate of G and has a known uncertainty description; and (b) extremizing said objective function J by solving the quadratic program $$\min_{\Delta u,\varepsilon} c^T \Delta u + d^T \tilde{G}\Delta u + e^T \varepsilon + \Delta u^T Q_0 \Delta u + \varepsilon^T Q_1 \varepsilon$$

subject to $$\tilde{g}^T(D_i \Delta u) + \alpha^{1/2} \|V^{1/2} D_i \Delta u\| + a_i^T b \leq b_{yi} + \varepsilon_i$$

$$A_u \Delta u \leq b_u$$

$$\varepsilon \geq 0$$

for $i = 1, \ldots, m$ where c represents weights on said input variables u in the objective function J, d represents such weights on said output variables y in the objective function J, d represents such weights on said output variables y in the objective function, $\varepsilon = [\varepsilon_1 \ldots \varepsilon_{n_y}]^T \geq 0 \in \Re^{n_y}$ is a slack variable that allows for violation in constraints on output variables y, $A_u \in \Re^{4n_u \times n_u}$ and $A_y \in \Re^{2n_y \times n_y}$ are matrices corresponding to desired ranges of values of said system manipulated and system-controlled variables, $b_u \in \Re^{4n_u}$ and $b_y \in \Re^{2n_y}$ are vectors corresponding to desired ranges of values of said system manipulated and system-controlled variables, U represents said uncertainty description, $Q_0 \in R^{n_u \times n_u}$ is a positive-definite symmetric (or possibly zero) matrix that allows for quadratic tradeoffs in system manipulated variables, and $Q_1 \in R^{n_y \times n_y}$ is a positive-definite symmetric (or possibly zero) matrix that allows for quadratic tradeoffs in slack variables; and (c) using a solution obtained in (b), controlling said system.

3. An apparatus for controlling a system in accordance with an objective function J, the operation of said system being describable by an equation $\Delta y = G \Delta u$, where y represents one or more system-controlled output variables, u represents one or more system-manipulated input variables, and G represents system gain parameters having a known uncertainty description, and where J is a function of G, said apparatus comprising:

(a) an estimator for deriving a nominal estimate $\tilde{G}$ of said system gain parameters G, where $\tilde{G}$ has a known uncertainty description and where $\tilde{J}$ is said objective function J applied to $\tilde{G}$; and (b) a computing circuit, responsive to at least one past value of said system-controlled output variables and of said system-manipulated input variables to compute steady-state targets for said system-manipulated variables u including extremizing said objective function J cast as a quadratic program, such that all of said system-controlled variables will remain feasible at steady-state for all possible values of the system parameters within said known uncertainty description, the steady-state targets computed by the computing being used to control the system.

4. An apparatus controlling a system in accordance with an objective function J, wherein the operation of said system is describable by an equation $\Delta y = G \Delta u$, where y represents one or more system-controlled output variables, u represents one or more system-manipulated input variables, and G represents system gain parameters having a known uncertainty description, said apparatus comprising:

(a) estimator circuitry for deriving a nominal estimate $\tilde{G}$ of system gain parameters G; and (b) computation circuitry, responsive to at least one past value of said system-controlled output variables and of said system-manipulated input variables, and responsive to said nominal estimate $\tilde{G}$, for extremizing said objective function J by solving the equation $$\min_{\Delta u,\varepsilon} c^T \Delta u + d^T \tilde{G}\Delta u + e^T \varepsilon + \Delta u^T Q_0 \Delta u + \varepsilon^T Q_1 \varepsilon$$

subject to $$\tilde{g}^T(D_i \Delta u) + \alpha^{1/2} \|V^{1/2} D_i \Delta u\| + a_i^T b \leq b_{yi} + \varepsilon_i$$

$$A_u \Delta u \leq b_u$$

$$\varepsilon \geq 0$$

for $i = 1, \ldots, m$ where c represents weights on said input variables u in the objective function J, d represents such weights on said output variables y in the objective function, $\varepsilon = [\varepsilon_1 \ldots \varepsilon_{n_y}]^T \geq 0 \in \Re^{n_y}$ is a slack variable that allows for violation in constraints on output variables y, $A_u \in \Re^{4n_u \times n_u}$ and $A_y \in \Re^{2n_y \times n_y}$ are matrices corresponding to desired ranges of values of said system manipulated and system-controlled variables, $b_u \in \Re^{4n_u}$ and $b_y \in \Re^{2n_y}$ are vectors corresponding to desired ranges of values of said system manipulated and system-controlled variables, U represents said uncertainty description, $Q_0 \in R^{n_u \times n_u}$ is a positive-definite symmetric (or possibly zero) matrix that allows for quadratic tradeoffs in system manipulated variables, and $Q_1 \in R^{n_y \times n_y}$ is a positive-definite symmetric (or possibly zero) matrix that allows for quadratic tradeoffs in slack variables such that said computation circuitry provides target values for system manipulated input variables for controlling said system.

5. An apparatus for controlling a system in accordance with an objective function J, the operation of said system being describable by an equation $\Delta y = G \Delta u$, where y represents one or more system-controlled output variables, u represents one or more system-manipulated input variables, and G represents system gain parameters having a known uncertainty description, and where J is a function of G, said apparatus comprising:

a) estimator means for deriving a nominal estimate $\tilde{G}$ of said system gain parameters G, where $\tilde{J}$ is said objective function applied to $\tilde{G}$; and b) computing means, responsive to at least one past value of said system-controlled output variables and of said system-manipulated input variables to compute steady-state targets for said system-manipulated input variables u including extremizing said objective function J cast as a quadratic program, such that all of said system-controlled variables will remain feasible at steady-state for all possible values of the system parameters within said known uncertainty description, the computed steady-state targets being used to control the system.

6. A computer program product comprising:

a computer usable medium for controlling a system in accordance with an objective function J, the operation of said system being describable by an equation $\Delta y = G \Delta u$, where y represents one or more system-controlled output variables, u represents one or more system-manipulated input variables, G represents system gain parameters, and where J is a function of G; and a set of computer program instructions embodied on the computer usable medium, including instructions to:

model said system according to an equation $\Delta y = \tilde{G} \Delta u$, where $\tilde{G}$ is a nominal estimate of G and has a known uncertainty description and where $\tilde{J}$ is said objective function J applied to $\tilde{G}$; and compute steady-state targets for said system-manipulated variables u including extremizing said objective function J cast as a quadratic program, such that all of said system-controlled variables will remain feasible at steady-state for all possible values of the system parameters within said known uncertainty description; and use the computed steady-state targets to control said system.

* * * * *

UNITED STATES PATENT AND TRADEMARK OFFICE
CERTIFICATE OF CORRECTION

PATENT NO. : 6,714,899 B2
DATED : March 30, 2004
INVENTOR(S) : Dean E. Kassmann

It is certified that error appears in the above-identified patent and that said Letters Patent is hereby corrected as shown below:

Column 8,
Line 49, delete " $\epsilon = \lfloor \epsilon_1 \ldots \epsilon_{n_y} \rfloor^T \geq 0 \in \Re^{n_y}$ " and insert -- $\varepsilon = \lfloor \varepsilon_1 \cdots \varepsilon_{n_y} \rfloor^T \geq 0 \in \Re^{n_y}$ --.

Line 52, delete " $-\epsilon_j + \underline{y}_j \leq y_j \leq \overline{y}_j + \epsilon_j \ j = 1,\ldots,n_y$ " and insert -- $-\varepsilon_j + \underline{y}_j \leq y_j \leq \overline{y}_j + \varepsilon_j \quad j = 1,\ldots,n_y$ --.

Column 12,
Line 58, delete "$\epsilon = \epsilon_1$" and insert -- $\varepsilon = \varepsilon_1$ --

Column 14,
Line 54, delete " $J_s = c^T \Delta u + d^T \tilde{G} \Delta u + e^T \epsilon$ " and insert -- $J_s = c^T \Delta + d^T \tilde{G} \Delta u + e^T \varepsilon$ --.

Column 23,
Line 25, delete " $\epsilon = \lfloor \epsilon_1 \ldots \epsilon_{n_y} \rfloor^T \geq 0 \in \Re^{n_y}$ " and insert -- $\varepsilon = \lfloor \varepsilon_1 \ldots \varepsilon_{n_y} \rfloor^T \geq 0 \in \Re^{n_y}$ --.

Column 24,
Line 31, delete " $\epsilon = \lfloor \epsilon_1 \ldots \epsilon_{n_y} \rfloor^T \geq 0 \in \Re^{n_y}$ " and insert -- $\varepsilon = \lfloor \varepsilon_1 \ldots \varepsilon_{n_y} \rfloor^T \geq 0 \in \Re^{n_y}$ --.

Signed and Sealed this

Twenty-seventh Day of July, 2004

JON W. DUDAS
*Acting Director of the United States Patent and Trademark Office*